T. B. COLLINS.
Wheel Harrow.
No. 91,914.   Patented June 29, 1869.
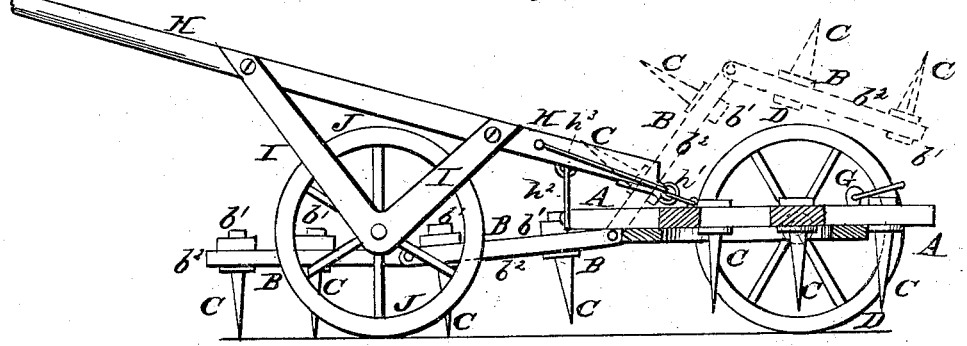
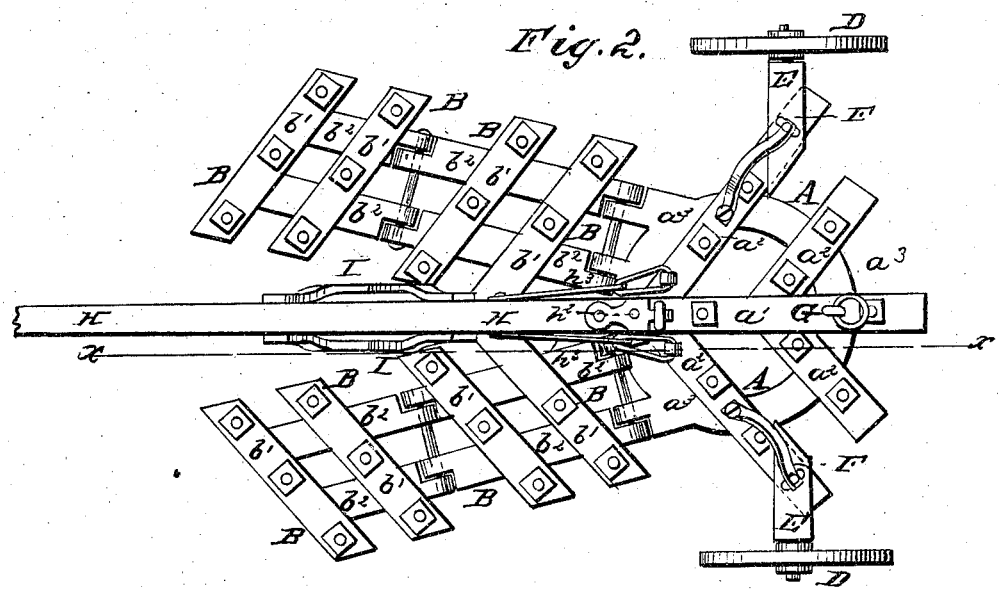
Witnesses:
O. Hinchman
Jno. R. Brooks
Inventor:
T. B. Collins.
per Munn & Co.
Attys.

United States Patent Office.

THOMAS B. COLLINS, OF NOANK, CONNECTICUT.

Letters Patent No. 91,914, dated June 29, 1869.

IMPROVEMENT IN HARROWS.

The Schedule referred to in these Letters Patent and making part of the same.

*To all whom it may concern:*

Be it known that I, THOMAS B. COLLINS, of Noank, in the county of New London, and State of Connecticut, have invented a new and useful Improvement in Harrows; and I do hereby declare that the following is a full, clear, and exact description thereof, which will enable others skilled in the art to make and use the same, reference being had to the accompanying drawing, forming part of this specification, in which—

Figure 1 is a vertical longitudinal section of my improved harrow, taken through the line $x-x$, fig. 2, and showing, in red lines, one part of the harrow turned up for transportation.

Figure 2 is a top view of the same.

Similar letters of reference indicate corresponding parts.

My invention has for its object to furnish an improved harrow, simple in construction, strong, and durable, which will adjust itself to irregularities of the surface of the ground, and which may be conveniently adjusted for transportation, without its being necessary to load it upon a wagon, or other vehicle, for that purpose; and It consists in the construction and combination of the various parts of the harrow, as hereinafter more fully described.

A is the forward part of the harrow, which is made diamond-shaped in its general form, and is formed by attaching a longitudinal bar, $a^1$, and inclined side-bars $a^2$, to a metallic ring-plate, $a^3$.

The ring-plate $a^3$ is formed with ears, or lugs, upon its rear edge, upon each side of the rear end of the longitudinal bar $a^1$, as shown in fig. 2.

B are the side parts, which are made diamond-shaped in their general form, and are formed by attaching inclined bars $b^1$ to the longitudinal metallic bars $b^2$.

The bars $b^2$ are formed with ears upon one or both ends, to receive the long bolts, or rods, by means of which the said parts B are hinged to each other, or to the forward part A.

One or more of the parts B may be used upon each side of the harrow, as may be desired.

C are the harrow-teeth, which are secured to the bars $a^1$ $a^2$ $b^1$, by nuts screwing upon their upper ends, as shown in figs. 1 and 2.

This construction makes the harrow flexible, so that it can adjust itself to the irregular surface of the ground being harrowed. It also enables the parts B to be folded, or turned up over the part A, as shown in red in fig. 1, for convenience in transportation.

D are the wheels, the axles E of which are formed upon sockets, so formed as to fit upon the outer ends of the rear or longer bars $a^2$, of the forward part A, where they are detachably secured in place by pins F, as shown in fig. 2.

The wheels D are only to be used when transporting the harrow from place to place, and are to be detached, when the harrow is to be used for cultivating the ground.

The draught is attached to the ring G, which is secured to the bar $a^1$, in the rear of its forward end, by an eye-bolt, so that the draught may be applied to the rear of the forward end of the harrow, causing the harrow to draw level upon the ground, instead of having its forward end lift up, as is the tendency when the draught is attached to the forward end of the harrow, in the ordinary manner.

H is a lever, to the forward end of which is attached a hook, $h^1$, which hooks into a staple, or eye-bolt, attached to the longitudinal bar $a^1$, a little in front of its rear end.

The lever H may also be connected with the rear end of the said bar $a^1$, by a link, $h^2$, pivoted to the under side of the said lever, and catching upon a bolt-head, or other catch, attached to the rear end of the said bar $a^1$.

The connection between the lever H and the part A of the harrow is strengthened by the jointed brace-rods $h^3$, the rear ends of which are pivoted to the sides of the said lever H, and the forward ends of which are pivoted to the bars $a^2$, of the part A, as shown in figs. 1 and 2.

To each side of the lever H is attached a bracket, I, between the lower ends or angles of which is pivoted the wheel, or wheels J, which, in connection with the wheels D, support the harrow while being transported from place to place.

The rear end of the lever H extends back into such a position that it may be conveniently reached and operated by the driver, for raising the forward part of the harrow, to pass over obstructions, the wheel J serving as a fulcrum to the lever.

Having thus described my invention,

What I claim as new, and desire to secure by Letters Patent, is—

1. An improved harrow, formed by hinging two or more diamond-shaped parts B to the diamond-shaped central or forward part A, said parts being constructed, connected, and operating substantially as herein shown and described, and for the purpose set forth.

2. The combination of the lever H and wheel, or wheels, J, with the forward or central part A of the harrow, substantially as herein shown and described, and for the purpose set forth.

3. The combination of the detachable wheels and axles D E with the forward or central part A of the harrow, substantially in the manner herein shown and described, and for the purpose set forth.

THOMAS B. COLLINS.

Witnesses:
ALLEN AVERY,
LEMUEL CLIFT.